Aug. 10, 1965     T. J. McDEVITT ETAL     3,200,243
CENTERLINE GUIDE LIGHT (AIRCRAFT CARRIER)
Filed March 13, 1963     3 Sheets-Sheet 1
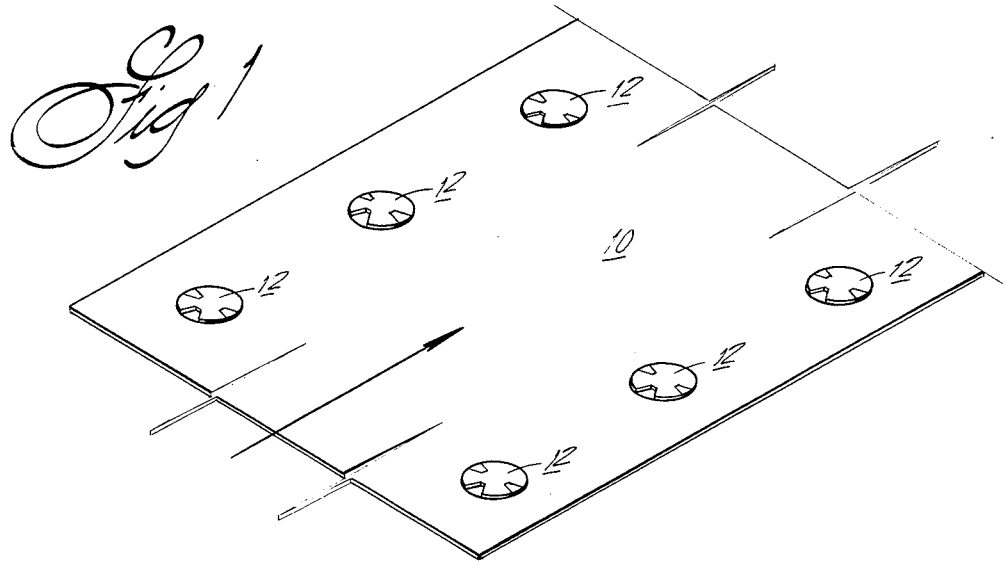
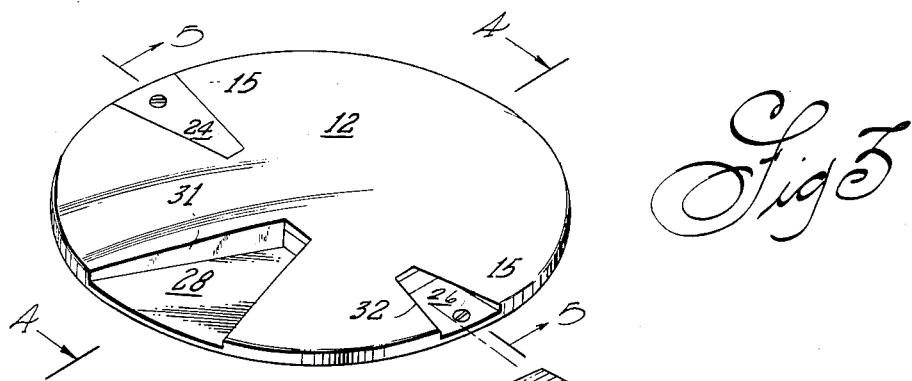
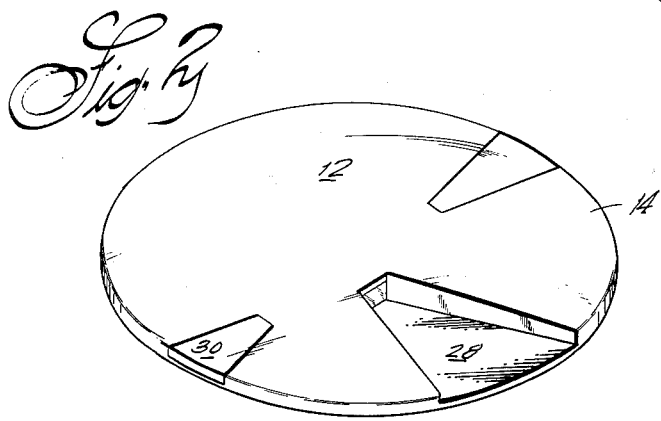
INVENTOR.
Thomas J. McDevitt
William Biebel
BY
Arthur L. Collins
Attorney Aug. 10, 1965

T. J. McDEVITT ETAL 3,200,243

CENTERLINE GUIDE LIGHT (AIRCRAFT CARRIER)

Filed March 13, 1963

INVENTOR.
Thomas J. McDevitt
William Biebel
BY Arthur L. Collins
Attorney

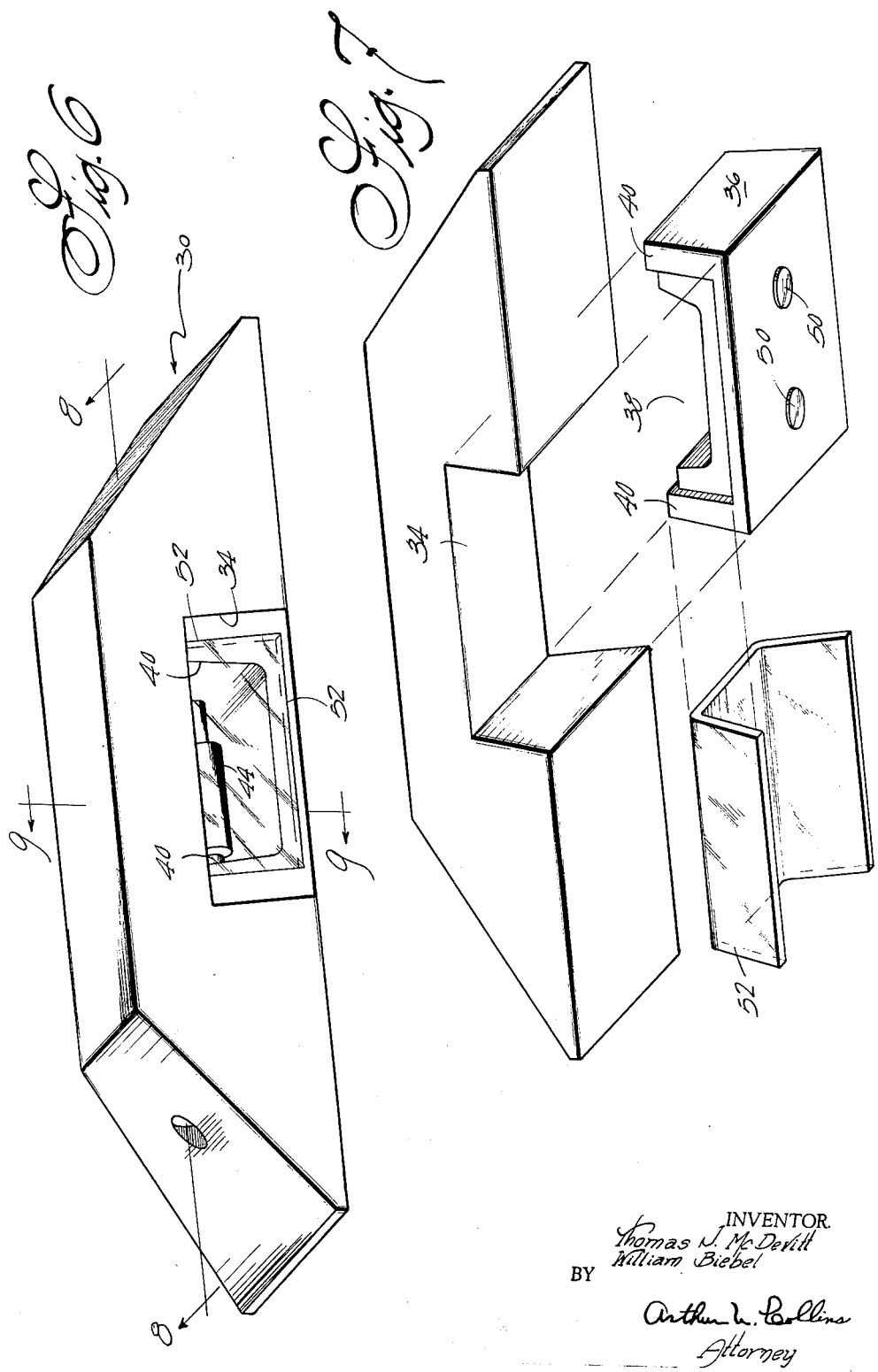

3,200,243
CENTERLINE GUIDE LIGHT (AIRCRAFT CARRIER)
Thomas J. McDevitt, Glenolden, and William J. Biebel, Media, Pa.
Filed Mar. 13, 1963, Ser. No. 264,990
1 Claim. (Cl. 240—1.2)
(Granted under Title 35, U.S. Code (1952), sec. 266)

This invention described herein may be manufactured and used by or for the Government of the United States of America for governmental purposes without the payment of any royalties thereon or therefor.

This invention relates to lighting devices and particularly to marker lights used to delineate a landing area for a descending aircraft.

Among the objects of this invention is to provide a lighting unit of efficient construction for mounting on a landing surface; which has a low silhouette and is easily negotiated by the wheels of a vehicle; which has a rugged construction to withstand the impact of an arresting hook suspended from an aircraft; which is installable on a carrier deck and requires little deck cutting and modification for its installation; which is adapted for easy replacement of a lamp; which is easily modified to emit light in more than one direction; and which creates no obstruction on a deck through its removal.

The foregoing and other objects, together with an understanding of the invention, will become apparent from the following description when read in light of the accompanying drawing.

In the drawing, where corresponding parts of the various figures are indicated by the same reference characters, FIG. 1 is a plan view of a portion of an aircraft carrier's landing deck having a number of the inventive lighting units that mark off a landing area;

FIG. 2 is a perspective view of the lighting unit;

FIG. 3 is the same as FIG. 2 except that it shows the cartridge unit out of its channel;

Figure 4:
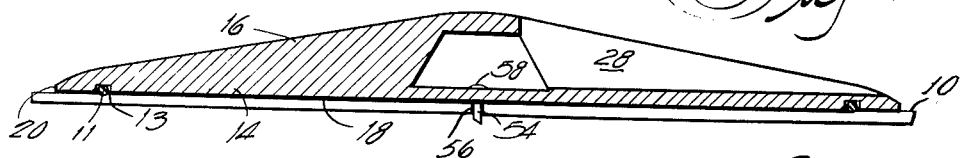
Figure 5:
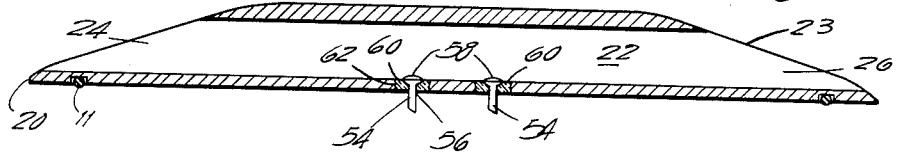
Figures 8, 9:
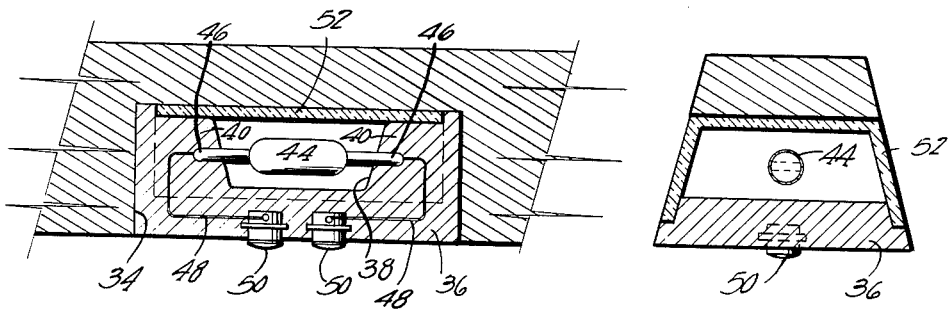
Figure 10:
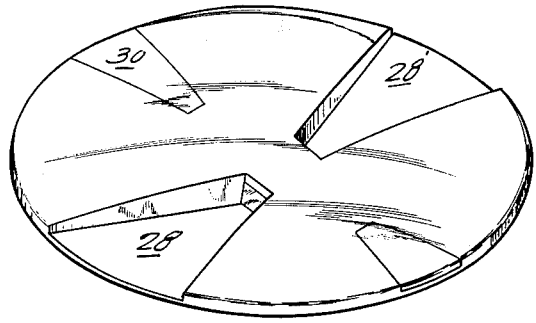

FIGS. 4 and 5 are cross-sectional views along the lines 4—4 and 5—5, respectively, of FIG. 3;

FIG. 6 is an enlarged view of the cartridge;

FIG. 7 is an exploded view of the cartridge of FIG. 6;

FIGS. 8 and 9 are cross-sectional views along the lines 8—8 and 9—9 of FIG. 6;

FIG. 10 is the same as FIG. 2, but shows a modification of the invention.

Referring to the drawing, in FIG. 1, 10 indicates a portion of an aircraft landing surface such as the deck of an aircraft carrier, not shown. A number of lighting units 12, embodying the invention, are placed on the deck 10 to mark the boundaries and/or center line of a runway which is to be used by a landing aircraft.

As shown in FIG. 2, the lighting unit 12 has a body 14 adapted to be secured to the deck 10 by bolts 15 or some other suitable means such as welds, not shown. A gasket 11 is shown, FIG. 4, seated in a groove 13 in the under surface of body 14 to prevent the passage of moisture between it and the deck. Body 14 is frusto conically shaped, having a top surface 16, a bottom 18, and an inclined peripheral side 20. Because the light unit is fixed on the deck and projects above it, it is an obstruction. However, this is not serious, since it is low and tapered. The height of the body, that is, the distance between the top surface 16 and bottom 18, is under one inch and the inclination of the side 20 is ten degrees. The overall appearance is that of a "pancake" and it is readily negotiated by the wheels of moving vehicles.

A lamp cartridge channel 22 passes diametrically through body 14 and opens, at 24 and 26, in the sidewall 23. In cross-section, cartridge channel 22 is trapezoidal at its center portion. Toward its ends, it penetrates the side 20 and is trough-like, that is, open at the top.

A light channel 28 is also provided in body 14. It is directed along a radius of the body which is perpendicular to cartridge channel 22 and connects with it at its back end. The four walls forming the light channel 28 diverge and, except for the portion where it joins the cartridge channel 22, the light channel 28 is open at its top. Light originating in the cartridge channel 22 is emitted through the light channel 28 in a limited zone, that is, at slight upward and downward angles to the runway surface in the approach direction. In fact, the light is most intense almost at the level of the runway surface, which is desirable for fast landing military aircraft.

Mounted in cartridge channel 22 is a lamp cartridge 30. It has the same configuration as the cartridge channel 22 and is inserted from either end thereof. When inserted, it fills the cartridge channel. With cartridge 30 in position, the outer surface of lamp body 14 is broken only by the opening of the light channel 28. The edges 31 of the light channel opening, as well as those 32 on the cartridge channel openings, are rounded to prevent cutting the arresting hook suspended from a landing aircraft on its impact with the light unit. To prevent water seepage into the cartridge channel 22, after the cartridge is inserted, a sealant, such as epoxy adhesive, is spread around the openings 24 and 26 and the ends of cartridge 30.

The body of the lamp cartridge, as in lamp body 14, is preferably made of metal sufficiently hard to suitably withstand a blow from an aircraft arresting hook, such as, stainless steel. There is a cut-out 34 in its lower central portion that penetrates its sides and bottom. It is generally rectangular in shape and it is dimensioned so as not to extend under the sloping ends of the cartridge. Within cut-out 34, a lamp holder 36 is mounted.

Lamp holder 36 is sized to fit the cut-out 34 in cartridge 30. It is made of resilient, electrical insulating material, such as rubber, and is bonded to the cartridge by a suitable adhesive. The upper central portion of the lamp holder 36 is cut-through, at 38, so that there are two upstanding legs 40 and 40. An electrical lamp 44, such as a Quartzline lamp manufactured by the General Electric Company, is carried in cut-through 38. The terminals 46 and 46 of lamp 44 project in opposite directions and have their ends embedded in the legs 40. A lead 48 extends from each of the lamp terminals 46 down a leg 40 and is connected to a contact 50 set in the under surface of the lamp holder. A light transparent enclosure or window 52, U-shaped in form and of non-breakable material, as, a plastic, is seated over the upper end of the lamp holder to cover its cut-through 38. Window 52 is counter sunk into the lamp holder so that all surfaces are flush and it is adhered so that lamp 44 is protected against moisture. All the edges of the window 52 are shorter than those of the lamp holder 34 so that force applied to any side of the lamp holder, especially on the top, is carried through the lamp holder and not the window.

Electric energy for lamp 44 is supplied from a source, not shown, which is connected to electric wires 54 passing through an aperture 56 in deck 10 from its underside. Electric wires 54 terminate in contacts 58 set in a rubber plug 60 which is seated in a hole 62 piercing the bottom of cartridge channel 22. Contacts 58 are located and spaced to engage those 50 in cartridge 30 with the latter's insertion and without hindering its free movement.

The advantages of the lighting units are believed to be apparent. In view of the fact that the lighting units are normally spaced at 40 foot intervals, the provision of a plurality of small deck apertures, about 1″, to pass electrical wiring from the units to lines below deck as against large holes, 6″ to 8″, for housing deck flush lamps, makes installation a relatively cheap and quick operation. For the same reason the moving of lighting units, as for changing landing lanes, is a minor consideration with the invention. Since no part of the lighting unit extends below deck, no safety precautions are necessary by way of special housings for the protection of personnel under the deck. Likewise, the absence of an individual lighting unit, as in the event of its being knocked off by a landing hook, exposes only the wire-passing aperture in the deck. It is readily plugged, as by welds, because of its small size, and even if unplugged, it is no obstruction. A faulty lamp, also, is easily replaced with little trouble merely by sliding into position a new lamp cartridge 30.

In FIG. 10, a variation of the lighting unit is shown. It is essentially the same as that already described except for the addition of a second light channel 28′. The additional light channel permits the emission of light in opposite directions, forward and backward, instead of just forward as in the case of the lighting unit heretofore described. A feature of this type is useful in marking parking lanes for aircraft.

Since it is obvious that the invention may be embodied in other forms and construction other than those illustrated and described, it is to be understood that the invention is limited only to the extent as defined in the appended claim.

What is claimed is:

A lighting unit for an aircraft landing surface said lighting unit comprising:

(a) a frustro-conical housing secured at its base to the aircraft landing surface, said housing having a first aperture that extends through the body of the housing along an axis parallel to its base, said housing also having a second aperture that extends perpendicularly from the medial point of the first aperture through the lateral surface of the housing along an axis parallel to the base of the housing;

(b) a cartridge removably secured in the first aperture in the housing, said cartidge having a transverse cut-out portion which is aligned with the second aperture when the cartridge occupies its secured position in the housing;

(c) a U-shaped lamp holding device including a base and a pair of upright legs of an electrically insulating material positioned in the cut out portion of the cartridge;

(d) an electrical lamp having a pair of electrical terminals respectively embedded in opposite legs of the lamp holding device;

(e) a transparent window which encloses the electrical lamp within the lamp holding device;

(f) a pair of electrical contacts positioned in the base of the lamp holding device such that a portion of each contact protrudes therefrom;

(g) means electrically connecting the terminals of the electrical lamp to the electrical contacts in the lamp holding device;

(h) an electrical insulator plug disposed in the base of the housing opposite each electrical contact in the lamp holding device when the cartridge occupies its secured position in the housing;

(i) an electrical contact mounted in each plug so as to engage juxtaposed contacts in the lamp holding device when the cartridge occupies its secured position in the housing;

(j) and an electrical power supply cable which extends upwardly through the landing surface and is connected to the contacts in the housing.

References Cited by the Examiner

UNITED STATES PATENTS

| 2,245,336 | 6/41 | Hamilton | 88—79 |
|---|---|---|---|
| 2,754,410 | 7/56 | Thielorn | 240—8.2 X |
| 3,007,034 | 10/61 | Reed et al. | 240—1.2 |
| 3,015,717 | 1/62 | Angier | 240—1.2 |
| 3,113,726 | 12/63 | Pennow et al. | 240—1.2 |
| 3,114,506 | 12/63 | Finch | 240—1.2 |
| 3,146,954 | 9/64 | Hochstein | 240—1.2 |

FOREIGN PATENTS

| 145,533 | 3/52 | Australia. |
|---|---|---|
| 552,232 | 3/43 | Great Britain. |

NORTON ANSHER, *Primary Examiner.*